Patented Apr. 19, 1932

1,854,462

UNITED STATES PATENT OFFICE

HENRY DREYFUS, OF LONDON, ENGLAND

TREATMENT OF MATERIALS MADE OF OR CONTAINING CELLULOSE DERIVATIVES

No Drawing. Application filed January 22, 1927, Serial No. 162,938, and in Great Britain November 23, 1926.

This invention relates to the dyeing, printing or stencilling of threads, yarns, knitted or woven fabrics or other products made of or containing cellulose acetate or other organic acid esters of cellulose, such for example as cellulose formate, propionate or butyrate, or the product obtained by the treatment of alkalized cellulose with para-toluene sulphochloride (e. g. the product known as "immunized cotton"), or made of or containing cellulose ethers, such as methyl, ethyl or benzyl cellulose, or the corresponding condensation products of cellulose and glycols or other polyhydric alcohols, all of which cellulose derivatives are hereinafter referred to as organic substitution derivatives of cellulose.

According to this invention materials made of or containing one or more of the said organic substitution derivatives of cellulose are dyed or otherwise colored with coloring matters or compounds comprising one or more thiocyanate or cyanate groups (or their iso-forms) linked either directly to the aryl dye nucleus or component thereof or connected therewith by means of one or more atoms or groups for example by means of a carbon side chain or by means of an amino or imino group.

Instead of employing compounds containing aryl dye nuclei or components thereof connected through an amino group to a thiocyanate or cyanate group or groups (or their iso forms) i. e. substituted ammonium thiocyanates, cyanates, isothiocyanates or isocyanates, the isomeric conversion products of such compounds may be employed, i. e. substituted ureas or thioureas. Such ureas or thioureas may be otherwise described as compounds or coloring matters comprising one or more —NH·CO·NHR or —NH·CS·NHR groups, R representing a hydrogen atom or an organic radicle.

Further according to the present invention such coloring matters may be formed on the fibre or material by combination of components, one or more of which contain such thiocyanate, cyanate, isothiocyanate, or isocyanate groups or which contain said urea, thiourea or substituted urea or thiourea residues.

The compounds for use according to the present invention may be prepared by any convenient method. Thus for example a thiocyanate or cyanate group may be linked directly to an aryl dye nucleus or component thereof by diazotization of a corresponding amino compound followed by warming the diazo compound with a thiocyanate or cyanate. Further a thiocyanate group may be introduced into the compound either directly jointed to the aryl dye nucleus or component thereof or joined to a carbon side chain thereof, by treatment with a halogen in presence of a thiocyanate.

A thiocyanate group attached to the nucleus may be converted to a cyanate group for instance by treating with mercuric oxide or lead acetate.

A thiocyanate or cyanate group may be introduced into a compound containing an amino group by treating the hydrochloride of the amino compound with a thiocyanate or cyanate either inorganic or organic. Simple heating will convert these substituted ammonium thiocyanates or cyanates into the corresponding thiourea or urea derivatives, one of the hydrogen atoms only of urea or thiourea being substituted in the case of having used an inorganic thiocyanate or cyanate, while two hydrogen atoms will be substituted if an organic thiocyanate or cyanate has been used.

The urea or thiourea derivatives may of course be prepared by other methods, for example by treatment of a compound containing an aryl dye nucleus or component thereof directly linked with a thiocyanate or cyanate group or groups with ammonia or an amine, or by treating a compound containing an aryl dye nucleus or component thereof containing an amino group with a urea halide or substituted urea halide.

The following examples of coloring matters or compounds for use according to the present invention and of the methods of preparing them are intended to be illustrative and not in any way limitative.

A. Anthraquinone dyestuffs

*Example 1.*—1-Acetylamino-4-aminoanthraquinone is diazotized in sulphuric acid solution and the diazo sulphate is heated with a solution of potassium thiocyanate. The dyestuff may be recrystallized from nitrobenzol. It has the formula

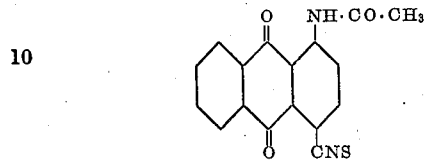

*Example 2.*—A solution of α-aminoanthraquinone hydrochloride is treated with potassium thiocyanate to obtain the dyestuff

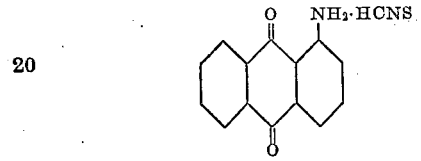

By heating this dyestuff a conversion takes place to the thiourea derivative

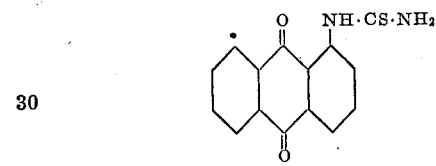

which is also a dyestuff which may be employed according to the present invention. By substituting an organic thiocyanate such as ethyl isothiocyanate or allyl isothiocyanate for the potassium thiocyanate, substituted anthraquinonyl thioureas may be obtained. Thus by heating with ethyl isothiocyanate the dyestuff

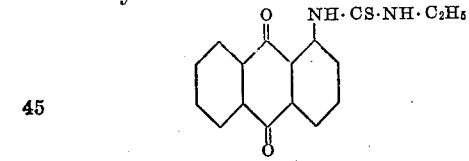

is produced, while by using allyl isothiocyanate and heating, the dyestuff

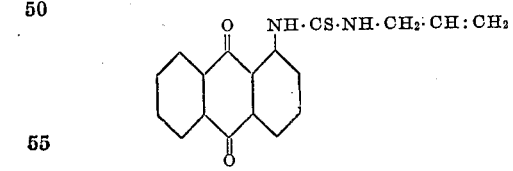

is obtained.

Two further thiocyanate groups may be introduced into compounds containing an ethylenic linkage, such as the above allyl derivative, by treatment with chlorine and a thiocyanate.

For the thiocyanate, inorganic or organic, used in Example 2 an inorganic or organic cyanate may be substituted so as to obtain the corresponding isocyanate and urea derivatives.

B. Azo dyestuffs

*Example 3.*—2.4-Dinitraniline is diazotized and coupled with salicylic acid-5-thiocyanate (obtained by treatment of salicylic acid with sodium thiocyanate and bromine) to yield the dyestuff

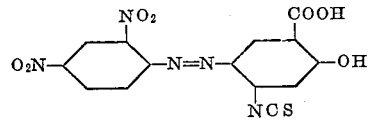

*Example 4.*—Aniline is coupled with α-naphthylamine and the product diazotized and coupled with o-hydroxyphenyl urea (obtained by heating o-hydroxyaniline hydrochloride with potassium cyanate) to give the dyestuff

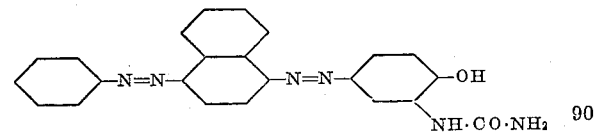

C. Dyestuffs produced on the fibre

*Example 5.*—m-Aminophenylurea is first prepared by heating an ethereal solution of m-nitraniline with moist cyanogen chloride, separating the product and reducing. It is diazotized and coupled with aniline. Cellulose acetate artificial silk fabric is dyed with the product from a solution of its hydrochloride and the dyestuff is then diazotized and coupled with o-hydroxyphenyl-urea.

D. Miscellaneous dyestuffs

*Example 6.*—2.2′ Dinitrodiphenylamine is dissolved in dilute sulphuric acid and treated with sodium thiocyanate and bromine dissolved severally in dilute sulphuric acid. The reaction mixture is strongly cooled. The dyestuff produced has the probable formula

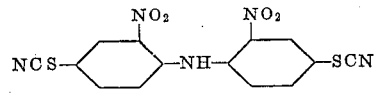

*Example 7.*—3.3′-Dinitro-4.4′-diaminodiphenyl hydrochloride is heated with potassium cyanate to obtain the dyestuff

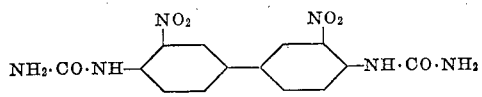

*Example 8.*—3.3′-Dinitro-4.4′-diaminodiphenylmethane hydrochloride is similarly treated with potassium cyanate to yield the dyestuff

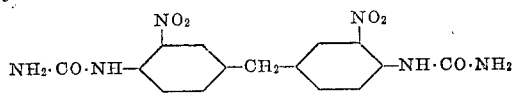

The dyestuffs to be applied according to the present invention are in general sufficiently soluble to admit of their being applied in aqueous solution and I prefer to employ this method where possible. When however they are not sufficiently soluble they may be applied to the materials in aqueous suspension or in colloidal solutions or dispersions obtained by grinding (for example in colloid mills), by dissolving in a solvent and pouring into water containing or not containing protective colloids, by pretreating the coloring matters or compounds with solubilising agents or by other methods. Of the solubilising agents which are suitable for obtaining such dispersions I may mention those described in U. S. Patents 1,618,413, 1,618,414, 1,694,413 and 1,716,721 and application No. 134,138 filed Sept. 7, 1926, viz. bodies of oily or fatty characteristics, namely higher fatty acids or sulphonated or other derivatives thereof containing salt forming groups, such as sulphoricinoleic acid or other sulphonated fatty acids or salts of such acids or bodies, for instance their alkali or ammonium salts, used alone or in conjunction with auxiliary solvents as described in U. S. Patent 1,690,481 and application No. 152,517 filed Dec. 3, 1926; carbocyclic compounds containing in their structure one or more salt forming groups or salts of such compounds; sulpho-aromatic fatty acids or salts thereof; and soluble resin soaps or sodium or other soluble salts of resin acids.

Though coloring matters and compounds belonging to particular groups have been described above, it is to be understood that the invention is not limited to coloring matters or compounds of these groups, but comprises broadly the application to materials made of or containing cellulose acetate or other of the herein described organic substitution derivatives of cellulose of any coloring matters or compounds in which an aryl dye nucleus or component thereof is linked either directly or indirectly to one or more thiocyanate, cyanate, isothiocyanate or isocyanate groups or to one or more urea, thiourea or substituted urea or thiourea residues. In the case of using components of aryl dye nuclei the actual coloring matters may be produced on the fibre or material.

Mixed goods containing for example, in addition to the organic substitution derivative or derivatives of cellulose, cotton, silk, wool, or the cellulose type of artificial silk or other fibres or threads, may be dyed or otherwise colored with or without employment of other dyestuffs or components according to the character of the threads or fibres used in association, said other dyestuffs or components being applied if desired before or after the application of the coloring matters or compounds of the present invention, or when not deleteriously affected thereby, they may be applied in conjunction therewith.

The term dyeing in the claims is to be understood to include printing and stencilling and also to include the case when the actual dye compound is produced on the material itself by interaction of components, as for example when dyeing by the azoic process.

What I claim and desire to secure by Letters Patent is:—

1. Process for dyeing material comprising an organic substitution derivative of cellulose, comprising dyeing the material with a coloring compound which comprises at least one XCN group, X representing oxygen or sulphur.

2. Process for dyeing material comprising an organic substitution derivative of cellulose, comprising dyeing the material with a coloring compound containing an aryl nucleus which comprises at least one XCN group linked to the aryl dye nucleus through the nitrogen atom of an amino group, X representing oxygen or sulphur.

3. Process for dyeing material comprising an organic substitution derivative of cellulose, comprising dyeing the material with an aqueous solution of a coloring compound which comprises at least one XCN group, X representing oxygen or sulphur.

4. Process for dyeing material comprising an organic substitution derivative of cellulose, comprising dyeing the material with an aqueous solution of a coloring compound containing an aryl nucleus which comprises at least one XCN group linked to the aryl dye nucleus through the nitrogen atom of an amino group, X representing oxygen or sulphur.

5. Process for dyeing material comprising an organic substitution derivative of cellulose, comprising dyeing the material with an aqueous colloidal solution of a coloring compound which comprises at least one XCN group, X representing oxygen and sulphur.

6. Process for dyeing material comprising an organic substitution derivative of cellulose, comprising dyeing the material with an aqueous colloidal solution of a coloring compound containing an aryl nucleus which comprises at least one XCN group linked to the aryl dye nucleus through the nitrogen atom of an amino group, X representing oxygen or sulphur.

7. Process for dyeing material comprising an organic substitution derivative of cellulose, comprising dyeing the material with an anthraquinone coloring compound which comprises at least one XCN group, X representing oxygen or sulphur.

8. Process for dyeing material comprising an organic substitution derivative of cellulose, comprising dyeing the material with an anthraquinone coloring compound which comprises at least one XCN group linked to the anthraquinone dye nucleus through the nitrogen atom of an amino group, X representing oxygen or sulphur.

9. Process for dyeing material comprising an organic substitution derivative of cellulose, comprising dyeing the material with an aqueous solution of an anthraquinone coloring compound which comprises at least one XCN group, X representing oxygen or sulphur.

10. Process for dyeing material comprising an organic substitution derivative of cellulose, comprising dyeing the material with an aqueous solution of an anthraquinone coloring compound which comprises at least one XCN group linked to the anthraquinone dye nucleus through the nitrogen atom of an amino group, X representing oxygen or sulphur.

11. Process for dyeing material comprising an organic substitution derivative of cellulose, comprising dyeing the material with an aqueous colloidal solution of an anthraquinone coloring compound which comprises at least one XCN group, X representing oxygen or sulphur.

12. Process for dyeing material comprising an organic substitution derivative of cellulose, comprising dyeing the material with an aqueous colloidal solution of an anthraquinone coloring compound which comprises at least one XCN group linked to the anthraquinone dye nucleus through the nitrogen atom of an amino group, X representing oxygen or sulphur.

13. Process for dyeing material comprising cellulose acetate, comprising dyeing the material with a coloring compound which comprises at least one XCN group, X representing oxygen or sulphur.

14. Process for dyeing material comprising cellulose acetate, comprising dyeing the material with a coloring compound containing an aryl nucleus which comprises at least one XCN group linked to the aryl dye nucleus through the nitrogen atom of an amino group, X representing oxygen or sulphur.

15. Process for dyeing material comprising cellulose acetate, comprising dyeing the material with an aqueous solution of a coloring compound which comprises at least one XCN group, X representing oxygen or sulphur.

16. Process for dyeing material comprising cellulose acetate, comprising dyeing the material with an aqueous solution of a coloring compound containing an aryl nucleus which comprises at least one XCN group linked to the aryl dye nucleus through the nitrogen atom of an amino group, X representing oxygen or sulphur.

17. Process for dyeing material comprising cellulose acetate, comprising dyeing the material with an aqueous colloidal solution of a coloring compound which comprises at least one XCN group, X representing oxygen and sulphur.

18. Process for dyeing material comprising cellulose acetate, comprising dyeing the material with an aqueous colloidal solution of a coloring compound containing an aryl nucleus which comprises at least one XCN group linked to the aryl dye nucleus through the nitrogen atom of an amino group, X representing oxygen or sulphur.

19. Process for dyeing material comprising cellulose acetate, comprising dyeing the material with an anthraquinone coloring compound which comprises at least one XCN group, X representing oxygen or sulphur.

20. Process for dyeing material comprising cellulose acetate, comprising dyeing the material with an anthraquinone coloring compound which comprises at least one XCN group linked to the anthraquinone dye nucleus through the nitrogen atom of an amino group, X representing oxygen or sulphur.

21. Process for dyeing material comprising cellulose acetate, comprising dyeing the material with an aqueous solution of an anthraquinone coloring compound which comprises at least one XCN group, X representing oxygen or sulphur.

22. Process for dyeing material comprising cellulose acetate, comprising dyeing the material with an aqueous solution of an anthraquinone coloring compound which comprises at least one XCN group linked to the anthraquinone dye nucleus through the nitrogen atom of an amino group, X representing oxygen or sulphur.

23. Process for dyeing material comprising cellulose acetate, comprising dyeing the material with an aqueous colloidal solution of an anthraquinone coloring compound which comprises at least one XCN group, X representing oxygen or sulphur.

24. Process for dyeing material comprising cellulose acetate, comprising dyeing the material with an aqueous colloidal solution of an anthraquinone coloring compound which comprises at least one XCN group linked to the anthraquinone dye nucleus through the nitrogen atom of an amino group, X representing oxygen or sulphur.

25. Material comprising an organic substitution derivative of cellulose, dyed with a coloring compound which comprises at least one XCN group, X representing oxygen or sulphur.

26. Material comprising cellulose acetate, dyed with a coloring compound which comprises at least one XCN group, X representing oxygen or sulphur.

In testimony whereof I have hereunto subscribed my name.

HENRY DREYFUS.